US011082171B2

(12) United States Patent
Sundaresan et al.

(10) Patent No.: US 11,082,171 B2
(45) Date of Patent: Aug. 3, 2021

(54) SYSTEMS AND METHODS FOR SELECTING A SPECTRAL SEGMENT FOR A DOWNLINK TRANSMISSION

(71) Applicant: CABLE TELEVISION LABORATORIES, INC., Louisville, CO (US)

(72) Inventors: Karthik Sundaresan, Boulder, CO (US); Jingjie Zhu, Erie, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 38 days.

(21) Appl. No.: 16/593,767

(22) Filed: Oct. 4, 2019

(65) Prior Publication Data
US 2020/0112405 A1 Apr. 9, 2020

Related U.S. Application Data

(60) Provisional application No. 62/741,125, filed on Oct. 4, 2018.

(51) Int. Cl.
H04L 5/00 (2006.01)
H04L 27/26 (2006.01)

(52) U.S. Cl.
CPC ............ H04L 5/0007 (2013.01); H04L 5/006 (2013.01); H04L 5/0046 (2013.01); H04L 27/2608 (2013.01)

(58) Field of Classification Search
CPC ............ H04L 27/2608; H04L 27/2646; H04L 5/0007; H04L 5/0046; H04L 5/006
USPC ........................................................ 370/329
See application file for complete search history.

(56) References Cited

U.S. PATENT DOCUMENTS

| 9,444,594 | B2 * | 9/2016 | Sun | H04Q 11/0071 |
| 2015/0195076 | A1 * | 7/2015 | Sun | H04L 5/0039 370/329 |
| 2016/0226739 | A1 * | 8/2016 | Hamzeh | H04W 72/121 |
| 2018/0102868 | A1 * | 4/2018 | Sundaresan | H04L 5/006 |
| 2018/0131582 | A1 * | 5/2018 | Schnitzer | H04L 12/2869 |
| 2018/0294837 | A1 * | 10/2018 | Chapman | H04B 3/487 |
| 2019/0305876 | A1 * | 10/2019 | Sundaresan | H04L 43/08 |

* cited by examiner

Primary Examiner — Robert J Lopata
(74) Attorney, Agent, or Firm — Elevated IP, LLC

(57) ABSTRACT

The present disclosure generally relates to systems, methods and software for selecting a spectral segment for important downlink and/or uplink transmissions. Particularly, the spectral segment may be a set of contiguous subcarriers within a plurality of subcarriers transmitting over a channel to a population of cable modems. In an embodiment, the systems, methods and software disclosed herein optimize placement of a physical link channel (PLC) within an OFDM channel. In an embodiment, the system, methods and software disclosed herein optimize placement of a ranging region within an OFDMA channel.

14 Claims, 10 Drawing Sheets

SYSTEMS AND METHODS FOR SELECTING A SPECTRAL SEGMENT FOR A DOWNLINK TRANSMISSION

CROSS-REFERENCE TO RELATED APPLICATIONS

This application claims the benefit of and priority to U.S. Provisional Patent Application No. 62/741,125, filed Oct. 4, 2018, which is hereby incorporated by reference in its entirety.

STATEMENT REGARDING FEDERALLY SPONSORED RESEARCH

None.

BACKGROUND

Ensuring reliable downlink or uplink transmissions for a population of user devices is critical for some network applications. For example, configuration information must be readily accessible by devices attempting to access a network. For this purpose, the cable modem termination system (CMTS) assigns a unique physical link channel (PLC) to each orthogonal frequency division multiplexing (OFDM) channel. A PLC is a narrowband signaling channel located within a downstream OFDM channel. The PLC enables "blind" channel acquisition by cable modems (CMs) and provides downstream timing reference and scattered pilot pattern synchronization. When a CM initializes, it first locates a PLC and acquires enough configuration information to join a primary downstream profile in the main OFDM channel, but a CM that cannot lock on the PLC will fall offline. Thus, it is of paramount importance to place the PLC in the cleanest part of the spectrum so that all CMs can access the network.

The CMTS also assigns a unique part of the channel dedicated to a ranging region, to each orthogonal frequency division multiplexing with Multiple Access (OFDMA) channel. For upstream channels, a ranging burst is used to adjust a CM's transmit timing, power and pre-equalization. This ranging region needs to be in the cleanest part of the spectrum so that all CMs can access the network. However, with potentially hundreds of CMs using a channel, it is difficult to identify which part of the spectrum will accommodate all devices.

SUMMARY

The present disclosure generally relates to systems, methods and software for selecting a spectral segment for important downlink and/or uplink transmissions. Particularly, the spectral segment may be a set of contiguous subcarriers within a plurality of subcarriers transmitting over a channel to a population of cable modems. In an embodiment, the systems, methods and software disclosed herein optimize placement of a physical link channel (PLC) within an OFDM channel. In an embodiment, the system, methods and software disclosed herein optimize placement of a ranging region within an OFDMA channel.

In an aspect, a method for selecting a segment within a plurality of subcarriers for a transmission over a channel to a population of cable modems comprises: generating a least-common-denominator profile of maximum bit-loading values for the population of cable modems over a range of subcarriers; identifying segments of contiguous subcarriers within the least-common-denominator profile having the same bit-loading value; and selecting one of the segments for a transmission by: (i) choosing the segment with the highest bit-loading value and the widest range, when the width of the segment is equal to or greater than a target width; (ii) when no segments have a width equal to or greater than a target width, theoretically combining the segment having the highest bit-loading value with its immediate neighbor segment having a next highest bit-loading value to create a combined segment having a combined width at the next highest bit-loading value, then choosing the combined segment when the combined width is equal to or greater than the target width; or (iii) repeating step (ii) until a combined segment with the target width is created. In an embodiment, the method further comprises inserting the transmission into the selected segment and transmitting the transmission to the population of cable modems or transmitting the uplink transmission from the population of cable modems to a CMTS. For example, the transmission may be transmitted as part of a new least-common-denominator profile.

In an embodiment, generating a least-common-denominator profile comprises: receiving channel measurement data from each cable modem of the population for each of the plurality of subcarriers; calculating, from the received channel measurement data, a maximum bit-loading value for each cable modem per subcarrier; and converting the maximum bit-loading value for each cable modem per subcarrier into a maximum bit-loading value for the population of cable modems per subcarrier to obtain the least-common-denominator profile.

In an embodiment, received channel measurement data is downlink or uplink modulation error ratio (RxMER) data.

In an embodiment, a method for selecting a segment within a plurality of subcarriers for a transmission over a channel to a population of cable modems further comprises optimizing placement of the transmission within the segment. For example, the transmission may be placed at a midpoint of the selected segment or shifted away from interference occurring near an edge of the selected segment. In an embodiment, the placement of the transmission is calculated by weighting interference at both edges of the selected segment. In an embodiment, the transmission begins at the nearest whole integer frequency.

In an embodiment, the transmission is a downlink transmission or an uplink transmission. In an embodiment, the downlink transmission is selected from the group consisting of a physical link channel (PLC) or another logical control channel. In an embodiment, the uplink transmission is selected from the group consisting of a ranging region or a logical control channel.

In an embodiment, a target width for the spectral segment is about the same as the width of the transmission. In an embodiment, a target width for the spectral segment is selected from a range between 1 MHz and 10 MHz, or between 2 MHz and 8 MHz, or between 3 MHz and 6 MHz. In an embodiment, a target width for the spectral segment is about 10 MHz, or 8 MHz, or 6 MHz, or 4 MHz, or 3 MHz, or 2 MHz.

In an embodiment, the bit-loading value of the selected segment is equal to, greater than, or less than a threshold. For example, systems, methods and/or software disclosed herein may set a bit-loading threshold for placement of the transmission that is greater than or equal to a bit-loading value where noise becomes problematic.

In an aspect, a system for selecting a segment within a plurality of subcarriers for a transmission over a channel to a population of cable modems comprises: a profile management unit configured to receive channel measurement data from each of a population of cable modems via a cable modem termination system operably communicating with each of the cable modems via a cable access network, to generate a least-common-denominator profile for the population of cable modems, to identify segments of subcarriers within the least-common-denominator profile having the same bit-loading value, and to select the segment of the least-common-denominator profile for placement of a transmission based on the received channel measurement data by: (i) choosing the segment with the highest bit-loading value and the widest range, when the width of the segment is equal to or greater than a target width; (ii) when no segments have a width equal to or greater than a target width, theoretically combining the segment having the highest bit-loading value with its immediate neighbor segment having a next highest bit-loading value to create a combined segment having a combined width at the next highest bit-loading value, then choosing the combined segment when the combined width is equal to or greater than the target width; or (iii) repeating step (ii) until a combined segment with the target width is created; and the cable modem termination system configured to transmit the transmission to the population of cable modems or to receive the transmission from the population of cable modems.

In an embodiment, the profile management unit is disposed within the cable modem termination system or externally to the cable modem termination system. In an embodiment, the profile management unit is further configured to optimize placement of the transmission within the segment.

In an aspect, a non-transitory computer-readable medium has a plurality of non-transitory instructions executable with a processor for selecting a segment within a plurality of subcarriers for a transmission over a channel to a population of cable modems, the plurality of non-transitory instructions being executable for: generating a least-common-denominator profile of maximum bit-loading values for the population of cable modems over a range of subcarriers; identifying segments of contiguous subcarriers within the least-common-denominator profile having the same bit-loading value; and selecting one of the segments for a transmission by: (i) choosing the segment with the highest bit-loading value and the widest range, when the width of the segment is equal to or greater than a target width; (ii) when no segments have a width equal to or greater than a target width, theoretically combining the segment having the highest bit-loading value with its immediate neighbor segment having a next highest bit-loading value to create a combined segment having a combined width at the next highest bit-loading value, then choosing the combined segment when the combined width is equal to or greater than the target width; or (iii) repeating step (ii) until a combined segment with the target width is created.

In an embodiment, the plurality of non-transitory instructions are further executable for optimizing placement of the transmission within the segment.

In an embodiment, the plurality of non-transitory instructions are further executable for calculating the placement of the transmission within the selected segment by weighting interference at both edges of the selected segment.

BRIEF DESCRIPTION OF THE DRAWINGS

Illustrative embodiments of the present invention are described in detail below with reference to the attached drawings.

DETAILED DESCRIPTION

In general, the terms and phrases used herein have their art-recognized meaning, which can be found by reference to standard texts, journal references and contexts known to those skilled in the art. The following definitions are provided to clarify their specific use in the context of this description.

As used herein, a "profile" is a specific configuration of modulation orders for each subcarrier in the OFDM channel. A profile allows the channel to operate at a higher modulation order in clean parts of the spectrum and then switch to more robust (lower) modulation orders when there is interference present.

As used herein, "least-common-denominator (LCD) profile" and "Profile A" are used interchangeably. These terms refer to a baseline profile that accommodates all active cable modems on a channel. Methods for computing Profile A are disclosed, for example, in U.S. patent application Ser. No. 15/729,058 (US Pat. Pub. No. 2018/0102868) and Ser. No. 16/377,030, each of which is hereby incorporated by reference in its entirety.

As used herein, a "segment" is a set of contiguous subcarriers with the same modulation order (bit loading) within a profile.

As used herein, modulation error ratio (MER) data quantifies the performance of a digital transmitter or receiver in a network. For example, imperfect digital signals may include noise, carrier suppression, distortion and other features that can be observed when the digital signal is demodulated.

The hub is any system (e.g., a cable modem termination system (CMTS)), device, software, or combination thereof, typically located in a cable company's hub site, or "headend", which is used to provide high speed data services (i.e., downstream and upstream transmissions), such as cable Internet and Voice over Internet Protocol. The channels are generally network bridges and modems that provide bi-directional data communication via radio frequency channels on a Hybrid Fiber-Coaxial (HFC) or Radio Frequency over Glass (RFoG). The channels are used to deliver broadband Internet access in the form of cable Internet, taking advantage of the high bandwidth of a HFC and RFoG network.

Figure 3:
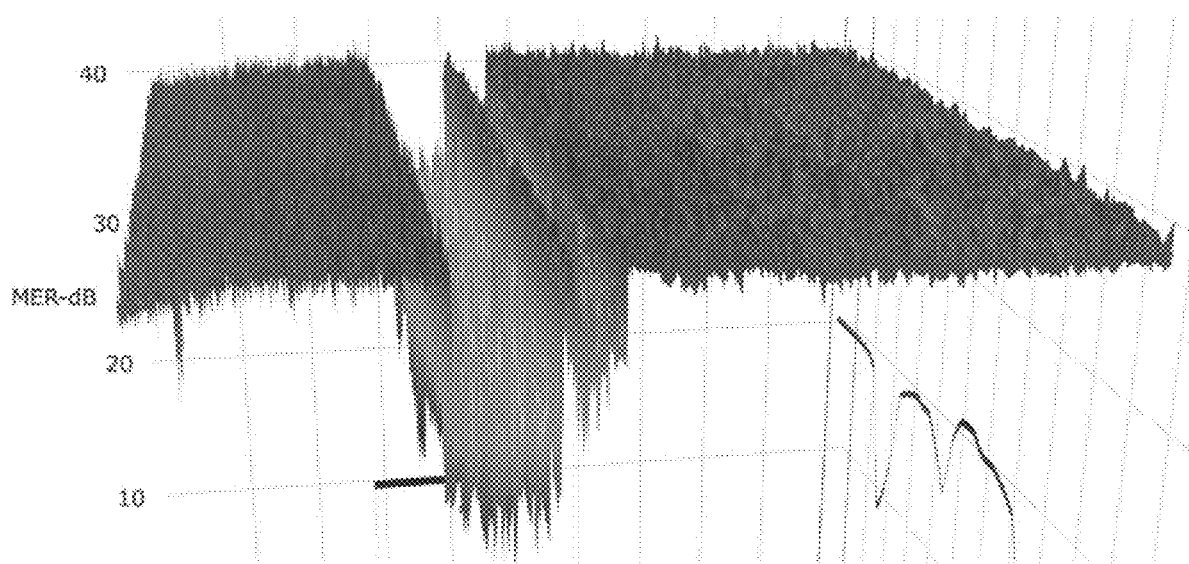
FIG. 3 is a schematic of PLC placement within an OFDM channel.

The hub is operable to configure the channels to communicate via a specific protocol (e.g., Data Over Cable Service Interface Specification, or "DOCSIS") specification. In this regard, the hub is operable to send control signals that direct the channels to operate in a particular manner with respect to the employed protocol. In an embodiment, the hub is operable to specify placement of a downlink transmission, such as a PLC, in an OFDM channel or the ranging region within an OFDMA channel. FIG. 3 illustrates such a PLC placement. The PLC is located in the center of a 6 MHz encompassed spectrum that contains no excluded subcarriers and uses a defined pattern of continuous pilots. The center of the lowest subcarrier of the 6 MHz encompassed spectrum containing the PLC at its center is on a 1 MHz grid. The PLC itself is a 400 KHz band surrounded by 8 continuous pilots.

Figure 1A:
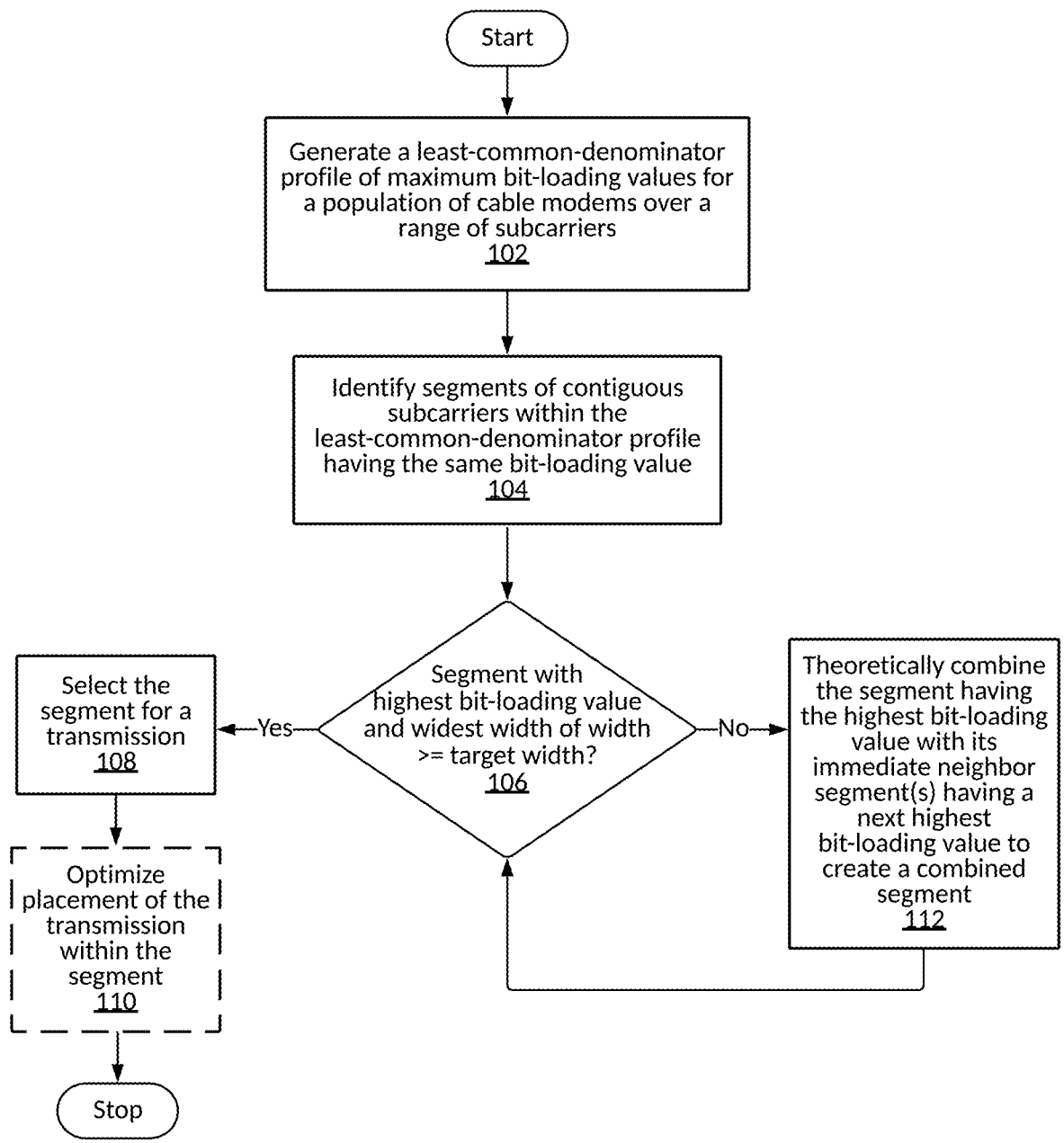
FIG. 1A is a flowchart illustrating steps in a method for selecting a segment within a plurality of subcarriers for a transmission over a channel to/from a population of cable modems, according to an embodiment.

FIG. 1A is a flowchart illustrating steps in a method for selecting a segment within a plurality of subcarriers for a transmission over a channel to a population of cable modems. In step 102, a least-common-denominator profile of maximum bit-loading values for the population of cable modems over a range of subcarriers is generated. Additional detail relating to generating an LCD profile is provided in FIG. 1B. In step 104, segments of contiguous subcarriers within the least-common-denominator profile having the same bit-loading value are identified. Step 106 is a query asking whether the segment with the highest bit-loading value and widest width has a width greater than or equal to a target width. If the answer to query 106 is "yes", that segment is selected for a transmission in step 108. If multiple segments with the same bit-loading value and widths equal to or greater than the target width are identified, a single segment may be selected by choosing the segment with the widest width, by choosing the segment having a width most closely matching the target width, by qualitatively or quantitatively assessing interference at edges of the segment, or by a combination of these techniques. In optional step 110, placement of the transmission within the segment is optimized. For example, in some embodiments, optimizing placement of the transmission may comprise shifting the transmission away from interference occurring near an edge of the selected segment and/or calculating an optimal placement for the transmission by weighting interference at both edges of the selected segment. If the answer to query 106 is "no", the segment with the highest bit-loading value is theoretically combined with its immediate neighbor segment having a next highest bit-loading value to create a combined segment having a combined width at the next highest bit-loading value, in step 112. The method then returns to query 106 to determine whether the combined width is greater than or equal to the target width. If the answer is "yes, the combined segment is selected for a transmission in step 108, and placement of the transmission within the segment is optionally optimized in step 110. If the answer is still "no", the combined segment is theoretically combined with its immediate neighbor segment(s) by repeating step 112 until a combined segment with the target width is created and the answer to query 106 is "yes".

Figure 1B:
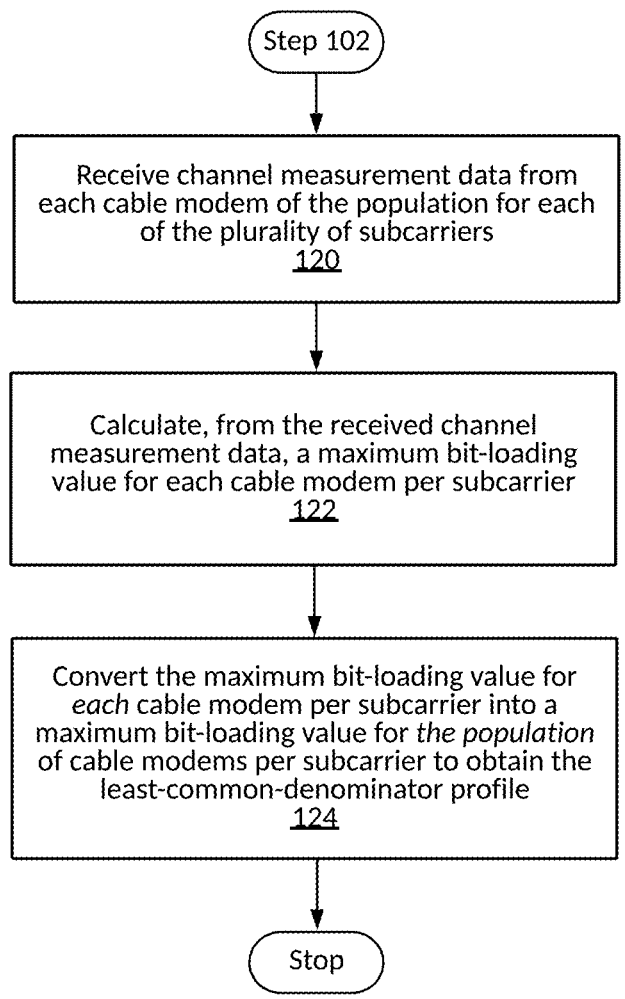
FIG. 1B is a flowchart providing greater detail in connection with generating a least-common-denominator profile.

FIG. 1B provides greater detail relating to step 102 for generating an LCD profile. In step 120, channel measurement data from each cable modem of the population of cable modems is received for each of the plurality of subcarriers. In step 122, a maximum bit-loading value for each cable modem per subcarrier is calculated from the received channel measurement data. In step 124, the maximum bit-loading value for each cable modem per subcarrier is converted into a maximum bit-loading value for the population of cable modems per subcarrier to obtain the least-common-denominator profile.

The embodiments herein may be implemented in a variety of ways as a matter of design choice. For example software and processors performing CMTS functions could be configured in a hub or a headend facility, and the physical layer functions could be in programmable hardware in the node. The invention can take the form of an entirely hardware embodiment, an entirely software embodiment or an embodiment containing both hardware and software elements.

Figure 2A:
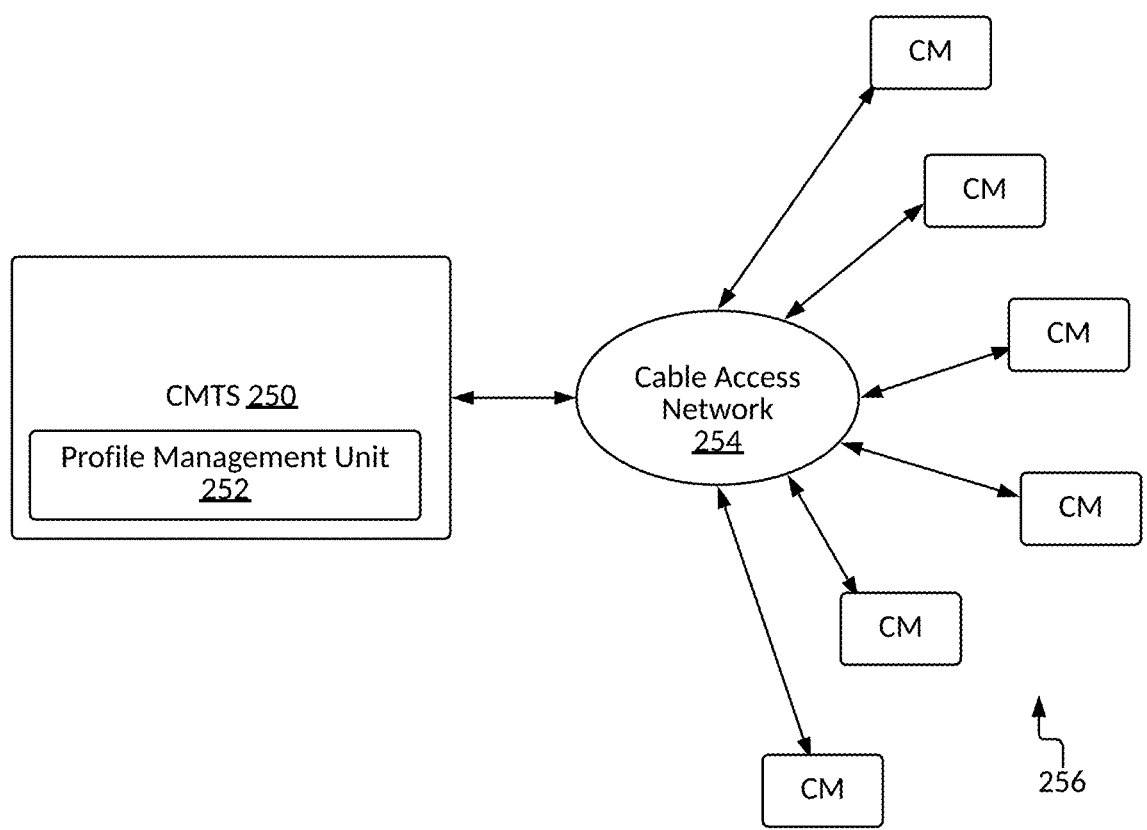
FIG. 2A is a block diagram of an exemplary system for performing methods described herein.

FIG. 2A is a block diagram of an exemplary system for performing methods described herein. For example, the system may include a cable modem termination system (CMTS) 250 configured to transmit a least-common-denominator profile to a plurality of cable modems 256 that are in operable communication with the CMTS via a cable access network 254. The cable access network 254 may include a combination of optical fiber and/or coaxial cables, amplifiers, and electrical/optical converters. A profile management unit (PMU) 252 is depicted as being disposed within the CMTS, but it should be recognized that the PMU may be implemented as a separate device from CMTS 250. The PMU 252 is configured to receive channel measurement data (e.g., RxMER data) from each of the cable modems, to generate a least-common-denominator profile for the population of cable modems, to identify segments of subcarriers within the least-common-denominator profile having the same bit-loading value, and to select the best segment of the least-common-denominator profile for placement of a transmission (e.g., a PLC) based on the received channel measurement data. The CMTS 250 then transmits the transmission to the plurality of cable modems 256. For example, the transmission may be transmitted to the cable modems as part of a new least-common-denominator profile.

Figure 2B:
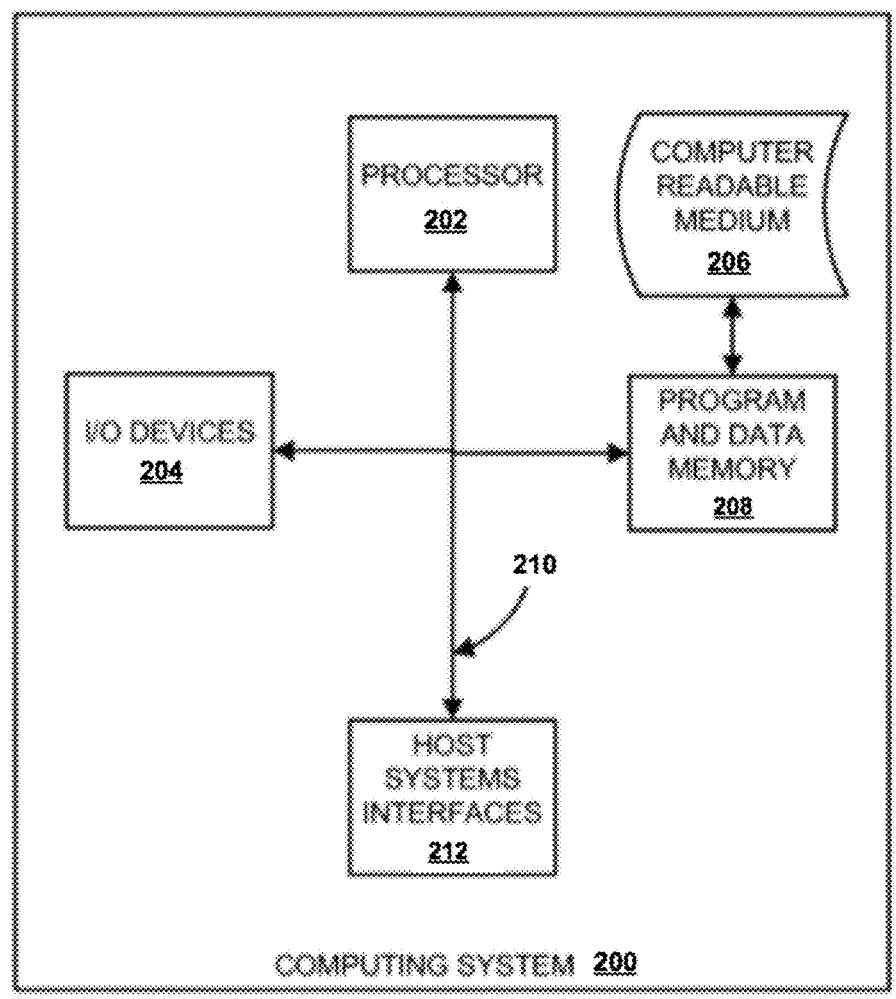
FIG. 2B is a block diagram of an exemplary computing system in which a computer readable medium provides instructions for performing methods described herein.

In an embodiment, the invention is implemented in software, which includes but is not limited to firmware, resident software, microcode, etc. FIG. 2B illustrates a computing system 200, such as a profile management unit, in which a computer readable medium 206 may provide instructions for performing any of the methods disclosed herein.

Furthermore, the invention can take the form of a computer program product accessible from the computer readable medium 206 providing program code for use by or in connection with a computer or any instruction execution system. For the purposes of this description, the computer readable medium 206 can be any apparatus that can tangibly store the program for use by or in connection with the instruction execution system, apparatus, or device, including the computer system 200.

The medium 206 can be any tangible electronic, magnetic, optical, electromagnetic, infrared, or semiconductor system (or apparatus or device). Examples of a computer readable medium 206 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 200, suitable for storing and/or executing program code, can include one or more processors 202 coupled directly or indirectly to memory 208 through a system bus 210. The memory 208 can include local memory employed during actual execution of the program code, bulk storage, and cache memories which provide temporary storage of at least some program code in order to reduce the number of times code is retrieved from bulk storage during execution. Input/output (I/O) devices 204 (including but not limited to keyboards, displays, pointing devices, etc.) can be coupled to the system either directly or through intervening I/O controllers. Network adapters may also be coupled to the system to enable the computing system 200 to become coupled to other data processing systems, such as through host systems interfaces 212, or remote printers or storage devices through intervening private or public networks. Modems, cable modem and Ethernet cards are just a few of the currently available types of network adapters.

The systems, methods and software disclosed herein are further illustrated by the following Example. This Example is for illustrative purposes only and is not intended to limit the disclosure.

Example 1

This Example discloses the selection of a segment within a plurality of subcarriers for a transmission, namely a PLC, over an OFDM channel to a population of cable modems.

Generating the Least-Common-Denominator Profile (Profile A)

A baseline profile which accommodates all the CMs active on a channel is identified by the methods disclosed, for example, in U.S. patent application Ser. No. 15/729,058 (US Pat. Pub. No. 2018/0102868) and Ser. No. 16/377,030. This baseline profile is the least-common-denominator (LCD) profile of all the RxMER across the whole channel of all the CMs. The input for the Profile A calculation can be based on the minimum, average or $n^{th}$ percentile MER values over a previous certain number of captures or it can be based on a single MER capture.

Figure 4:
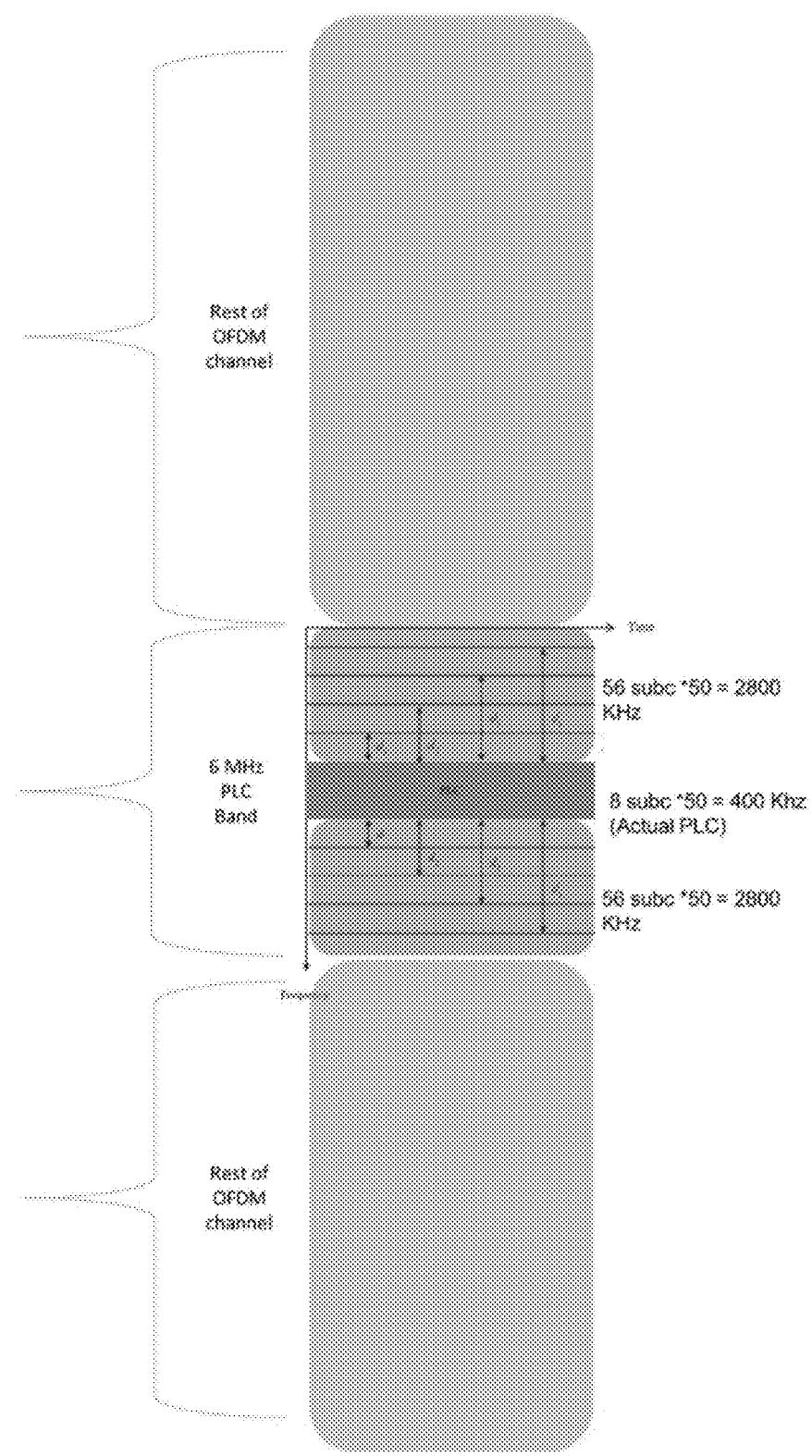
FIG. 4 shows RxMER data for one cable modem.
Figure 5:
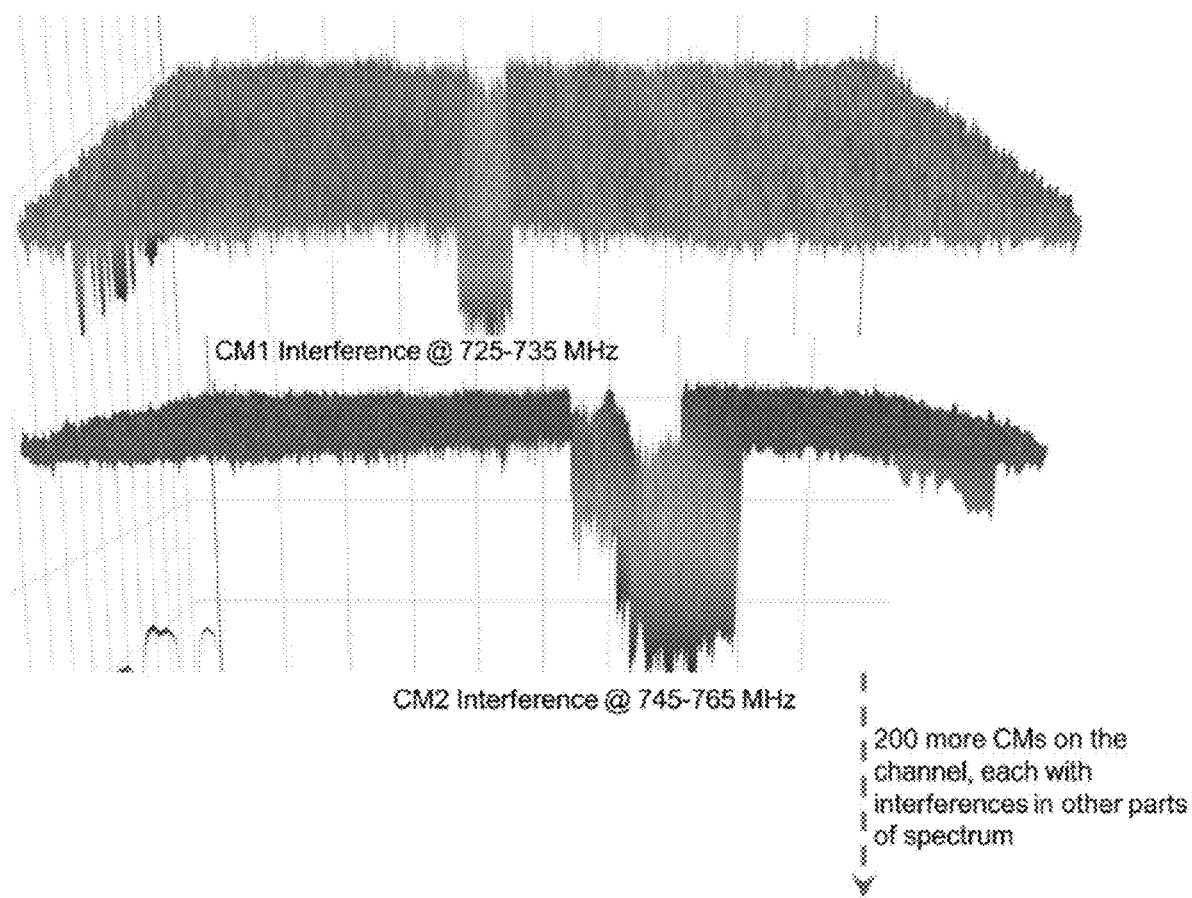
FIG. 5 shows RxMER data from two CMs with interference in different parts of the spectrum.
Figure 6:
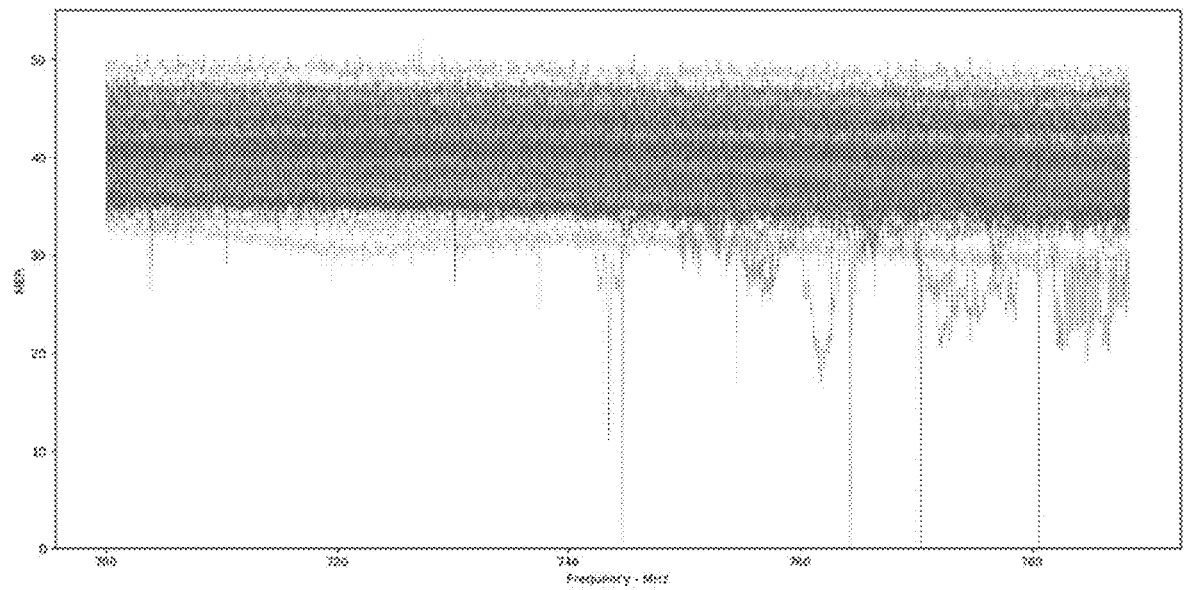
FIG. 6 shows RxMER data from 120 CMs on one OFDM channel.
Figure 7:
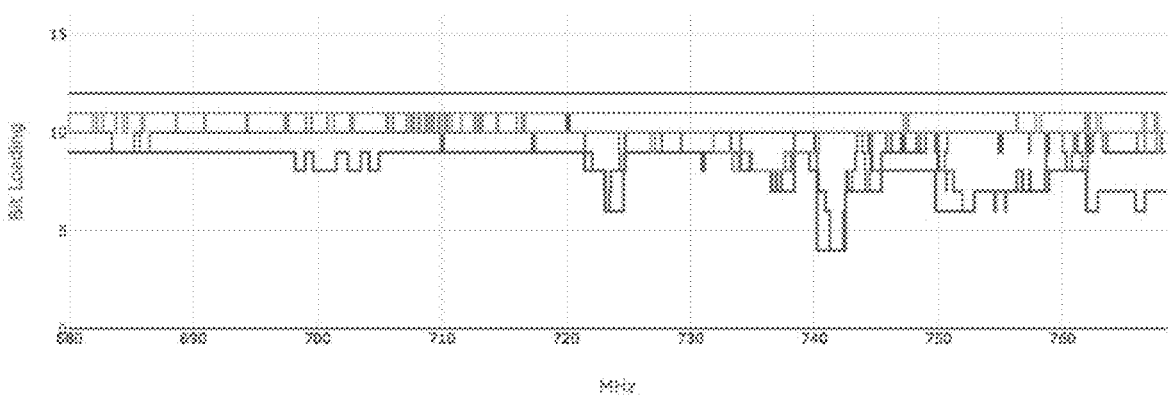
FIG. 7 shows profiles for the set of CMs shown in FIG. 6.

FIG. 4 shows RxMER data for one cable modem. FIG. 5 shows RxMER data from two CMs with interference in different parts of the spectrum. FIG. 6 shows RxMER data from 120 CMs on one OFDM channel. FIG. 7 shows profiles for the set of CMs shown in FIG. 6.

Identify Segments

Figure 8:
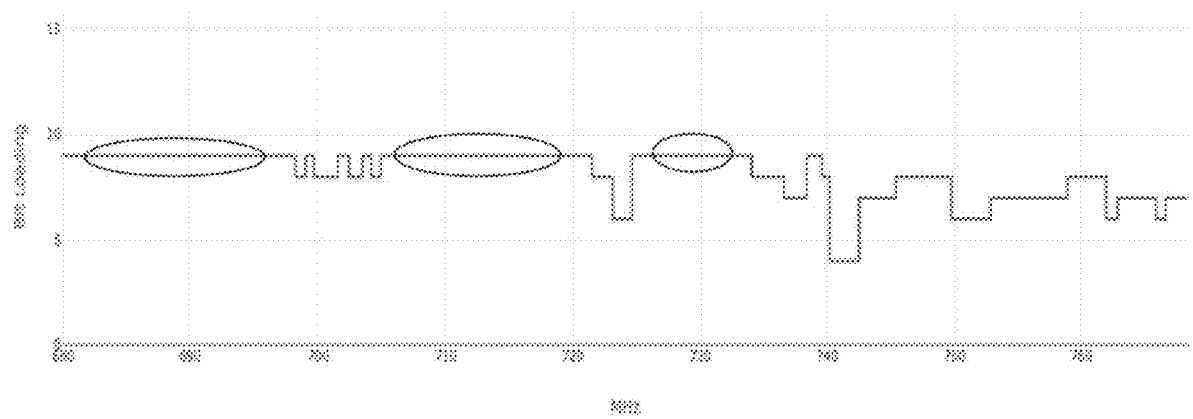
FIG. 8 shows the least-common-denominator (LCD) profile of FIG. 7 with the highest bit-loading segments circled.

Once Profile A is identified, the best segment capable of fitting the PLC must be found. A candidate segment needs to be wider than a target width, which in this case is the size of the PLC band (e.g. 6 MHz in D3.1). To find suitable segments, a list of potential candidate segments is created, with segments ranked first by bit-loading value and then by width. FIG. 8 shows the LCD profile of FIG. 7 with the highest bit-loading segments circled. If multiple segments with the same bit-loading value and widths equal to or greater than the target width are identified, a single segment may be selected by choosing the segment with the widest width, by choosing the segment having a width most closely matching the target width, by qualitatively or quantitatively assessing interference at edges of the segment, or by a combination of these techniques.

Combine Segments

Starting with the first segment at the top of the list of potential candidate segments, any segment having a width greater than the target width is identified as a successful candidate, and the best location within the segment for placement of the PLC can be determined.

If no segment width is greater than the target width, a segment must be theoretically combined with one of its immediate neighboring segments having the next highest bit-loading value. This combined segment gets placed in the list of candidate segments in the appropriate order determined first by bit-loading, and second by width.

Figure 9:
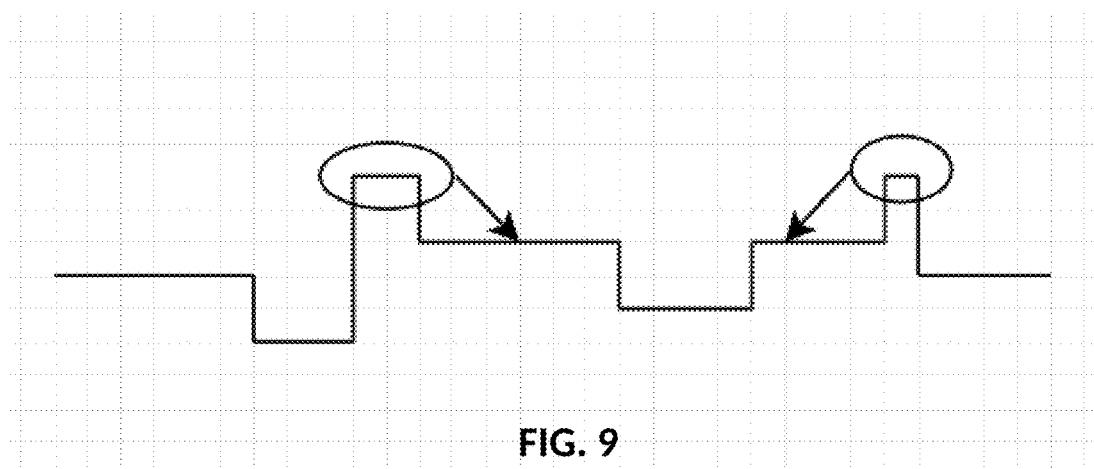
FIG. 9 shows a schematic of an LCD profile with highest bit-loading segments circled and arrows indicating the next-highest bit-loading segment that each segment would be combined with to create a segment having a combined width equal to or greater than a target width, according to an embodiment.

FIG. 9 shows a schematic of an LCD profile with highest bit-loading segments circled and arrows indicating the next-highest bit-loading segment that each segment would be theoretically combined with to create a segment having a combined width equal to or greater than a target width. If both immediate neighbor segments have the same bit-loading value, all three segments can be theoretically combined to create the combined segment with the combined width.

Optimize Placement of the Transmission

From the previous steps there may be one or more successful candidate segments. Next, one must select where within the segment the PLC will be placed. A simple method is to place the PLC at the midpoint of the segment so that it has the greatest distance from the edges of the segment where interference could be present. A more nuanced method is to rank all the possible bands within this segment, by a distance measure as defined here: The measure is $w_1(d_1)^2 + w_2(d_2)^2$, where $d_1$ and $d_2$ are the distance to the edge of the segment and, $w_1$ and $w_2$ are the weights given to the potential interference sources on both sides of the segment. The average standard deviation of each subcarrier in the frequency window (say, 6 MHz) over the last few, say 100, MER captures can also be added to part of the weighting process for all candidate segments.

Figure 10:
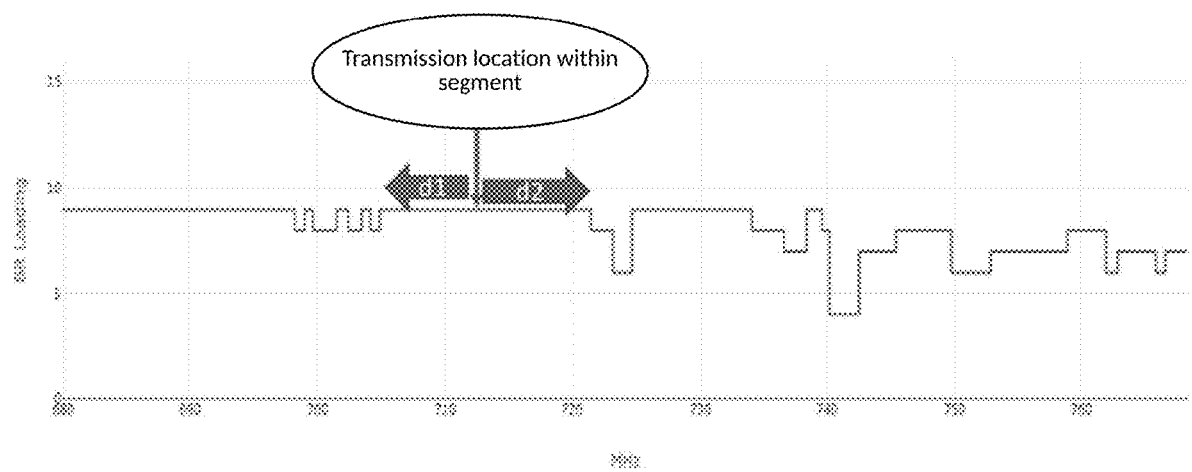
FIG. 10 shows an LCD profile with the placement of a transmission within a segment being weighted based on interference at edges of the segment, according to an embodiment.

FIG. 10 shows an LCD profile with the placement of a transmission within a segment being weighted based on interference at edges of the segment.

STATEMENTS REGARDING INCORPORATION BY REFERENCE AND VARIATIONS

All references cited throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments, exemplary embodiments and optional features, modification and variation of the concepts herein disclosed can be resorted to by those skilled in the art, and that such modifications and variations are considered to be within the scope of this invention as defined by the appended claims. The specific embodiments provided herein are examples of useful embodiments of the invention and it will be apparent to one skilled in the art that the invention can be carried out using a large number of variations of the devices, device components, and method steps set forth in the present description. As will be apparent to one of skill in the art, methods, software and apparatus/devices can include a large number of optional elements and steps. All art-known functional equivalents of materials and methods are intended to be included in this disclosure. Nothing herein is to be construed as an admission that the invention is not entitled to antedate such disclosure by virtue of prior invention.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure.

It must be noted that as used herein and in the appended claims, the singular forms "a", "an", and "the" include plural reference unless the context clearly dictates otherwise. Thus, for example, reference to "a processor" includes a plurality of such processors and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are described.

Whenever a range is given in the specification, for example, a range of integers, a temperature range, a time range, a composition range, or concentration range, all intermediate ranges and subranges, as well as all individual values included in the ranges given are intended to be included in the disclosure. As used herein, ranges specifically include the values provided as endpoint values of the range. As used herein, ranges specifically include all the integer values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous and can be used interchangeably with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" can be replaced with either of the other two terms. The invention illustratively described herein suitably can be practiced in the absence of any element or elements, limitation or limitations which is/are not specifically disclosed herein.

What is claimed is:

1. A method for selecting a segment within a plurality of subcarriers for a transmission over a channel to/from a population of cable modems, the method comprising:
    generating a least-common-denominator profile of maximum bit-loading values for the population of cable modems over a range of subcarriers;
    identifying segments of contiguous subcarriers within the least-common-denominator profile having the same bit-loading value; and
    selecting one of the segments for a transmission by:
        (i) choosing the segment with the highest bit-loading value and the widest range, when the width of the segment is equal to or greater than a target width;
        (ii) when no segments have a width equal to or greater than a target width, theoretically combining the segment having the highest bit-loading value with its immediate neighbor segment having a next highest bit-loading value to create a combined segment having a combined width at the next highest bit-loading value, then choosing the combined segment when the combined width is equal to or greater than the target width; or
        (iii) repeating step (ii) until a combined segment with the target width is created.

2. The method of claim 1, wherein the step of generating a least-common-denominator profile comprises:
    receiving channel measurement data from each cable modem of the population for each of the plurality of subcarriers;
    calculating, from the received channel measurement data, a maximum bit-loading value for each cable modem per subcarrier; and
    converting the maximum bit-loading value for each cable modem per subcarrier into a maximum bit-loading value for the population of cable modems per subcarrier to obtain the least-common-denominator profile.

3. The method of claim 2, wherein the received channel measurement data is downlink or uplink modulation error ratio (RxMER) data.

4. The method of claim 1 further comprising optimizing placement of the transmission within the segment.

5. The method of claim 4, wherein the transmission is placed at a midpoint of the selected segment or shifted away from interference occurring near an edge of the selected segment.

6. The method of claim 5, wherein the placement of the transmission is calculated by weighting interference at both edges of the selected segment.

7. The method of claim 1, wherein the transmission is a downlink transmission or an uplink transmission.

8. The method of claim 7, wherein the downlink transmission is selected from the group consisting of a physical link channel (PLC) or a logical control channel.

9. The method of claim 7, wherein the uplink transmission is selected from the group consisting of a ranging region or a logical control channel.

10. A non-transitory computer-readable medium having a plurality of non-transitory instructions executable with a processor for selecting a segment within a plurality of subcarriers for a transmission over a channel to a population of cable modems, the plurality of non-transitory instructions being executable for:

generating a least-common-denominator profile of maximum bit-loading values for the population of cable modems over a range of subcarriers;

identifying segments of contiguous subcarriers within the least-common-denominator profile having the same bit-loading value; and selecting one of the segments for a transmission by:
  (i) choosing the segment with the highest bit-loading value and the widest range, when the width of the segment is equal to or greater than a target width;
  (ii) when no segments have a width equal to or greater than a target width, theoretically combining the segment having the highest bit-loading value with its immediate neighbor segment having a next highest bit-loading value to create a combined segment having a combined width at the next highest bit-loading value, then choosing the combined segment when the combined width is equal to or greater than the target width; or
  (iii) repeating step (ii) until a combined segment with the target width is created.

11. The non-transitory computer-readable medium of claim 10, wherein the plurality of non-transitory instructions are further executable for:

receiving channel measurement data from each cable modem of the population for each of the plurality of subcarriers;

calculating, from the received channel measurement data, a maximum bit-loading value for each cable modem per subcarrier; and converting the maximum bit-loading value for each cable modem per subcarrier into a maximum bit-loading value for the population of cable modems per subcarrier to obtain the least-common-denominator profile.

12. The non-transitory computer-readable medium of claim 10, wherein the plurality of non-transitory instructions are further executable for optimizing placement of the transmission within the segment.

13. The non-transitory computer-readable medium of claim 10, wherein the transmission is placed at a midpoint of the selected segment or shifted away from interference occurring near an edge of the selected segment.

14. The non-transitory computer-readable medium of claim 13, wherein the plurality of non-transitory instructions are further executable for calculating the placement of the transmission within the selected segment by weighting interference at both edges of the selected segment.

* * * * *